US012768800B2

(12) United States Patent
Iwahori

(10) Patent No.: US 12,768,800 B2
(45) Date of Patent: Oct. 20, 2026

(54) LEARNING SYSTEM OF PRECIPITABLE WATER VAPOR ESTIMATION MODEL, PRECIPITABLE WATER VAPOR ESTIMATION SYSTEM, METHOD, AND COMPUTER-READABLE RECORDING MEDIUM

(71) Applicant: FURUNO ELECTRIC CO., LTD., Hyogo (JP)

(72) Inventor: Taiki Iwahori, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 564 days.

(21) Appl. No.: 18/085,496

(22) Filed: Dec. 20, 2022

(65) Prior Publication Data

US 2023/0117091 A1 Apr. 20, 2023

Related U.S. Application Data

(63) Continuation of application No. PCT/JP2021/022472, filed on Jun. 14, 2021.

(30) Foreign Application Priority Data

Jul. 14, 2020 (JP) ................................ 2020-120319

(51) Int. Cl.
*G01N 22/04* (2006.01)
*G01W 1/00* (2006.01)

(52) U.S. Cl.
CPC .............. *G01N 22/04* (2013.01); *G01W 1/00* (2013.01)

(58) Field of Classification Search
CPC .......... G01N 22/04; G01W 1/00; G01W 1/14; G01S 19/07; G01S 19/14; G06N 20/00; Y02A 90/10
See application file for complete search history.

(56) References Cited

U.S. PATENT DOCUMENTS 4,873,481 A * 10/1989 Nelson ................. G01K 11/006
374/E11.003
5,999,121 A 12/1999 Salonen
(Continued)

FOREIGN PATENT DOCUMENTS

CN 104951847 9/2015
CN 108387169 A * 8/2018 ............... G01B 7/16
(Continued)

OTHER PUBLICATIONS

Tanvir Islam et al, "Variational Bayes and the Principal Component Analysis Coupled with Bayesian Regulation Backpropagation Network to Retrieve Total Precipitable Water (TPW) From GCOM-W1/AMSR2", Oct. 2015, IEEE Journal of Selected Topics in Applied Earth Observations and Remote Sensing, V8,No. 10 (Year: 2015).*

(Continued)

*Primary Examiner* — Yossef Korang-Beheshti
(74) *Attorney, Agent, or Firm* — JCIPRNET

(57) ABSTRACT

A learning system of a precipitable water vapor estimation model includes a radio wave intensity acquisition part, a precipitable water vapor acquisition part, and a learning part. The radio wave intensity acquisition part acquires radio wave intensities of a plurality of frequencies among radio waves received by a microwave radiometer. The precipitable water vapor acquisition part acquires a precipitable water vapor calculated based on an atmospheric delay of a GNSS signal received by a GNSS receiver. Based on the radio wave intensities of the plurality of frequencies and the precipitable water vapor at a plurality of time points in a particular period, the learning part subjects an estimation model to machine learning such that an input data based on the radio wave intensities of the plurality of frequencies is taken as an input to output the precipitable water vapor.

5 Claims, 5 Drawing Sheets

(56) References Cited

U.S. PATENT DOCUMENTS

| | | | | |
|---|---|---|---|---|
| 6,067,852 | A | 5/2000 | Alber et al. | |
| 11,662,471 | B2 | 5/2023 | Okumura et al. | |
| 2011/0218734 | A1 * | 9/2011 | Solheim | G01W 1/10 702/3 |
| 2014/0035779 | A1 | 2/2014 | Solheim | |
| 2018/0209919 | A1 | 7/2018 | Minowa et al. | |
| 2019/0339416 | A1 * | 11/2019 | Elkabetz | G01W 1/02 |
| 2019/0340940 | A1 | 11/2019 | Elkabetz et al. | |

FOREIGN PATENT DOCUMENTS

| | | | | |
|---|---|---|---|---|
| CN | 109001382 A | * | 12/2018 | G01N 33/0036 |
| CN | 109322655 | | 2/2019 | |
| CN | 109917494 | | 6/2019 | |
| CN | 111291903 | | 6/2020 | |
| JP | H07146375 | | 6/1995 | |
| JP | H09257951 | | 10/1997 | |
| JP | 2008014939 | | 1/2008 | |
| JP | 2010060444 | | 3/2010 | |
| JP | 2017207459 | | 11/2017 | |
| JP | 2018072308 | | 5/2018 | |
| JP | 2018197734 | | 12/2018 | |
| JP | 7280947 | | 5/2023 | |
| JP | 2025127406 | | 9/2025 | |
| WO | 2020230501 | | 11/2020 | |
| WO | WO-2020230501 A1 | * | 11/2020 | G01S 19/14 |

OTHER PUBLICATIONS

Yong Han et al., "Analysis and Improvement of Tipping Calibration for Ground-Based Microwave Radiometers", May 3, 2000, IEEE Transactions on Geoscience and Remote Sensing, vol. 38, No. 3, https://radiometrics.com/wp-content/uploads/2021/10/Han_TGRS_2000.pdf (Year: 2000).*

N. Kuchler et al., "Calibration ground-based microwave radiometers: Uncertainty and drifts", Mar. 31, 2016, Radio Science, vol. 51, Issue 4 (Year: 2016).*

Patrizia Basili et al., "Atmospheric water vapor retrieval by means of both a GPS network and a microwave radiometer during an experimental campaign in Cagliari, Italy, in 1999", IEEE Transactions on Geoscience and Remote Sensing, Nov. 1, 2001, pp. 2436-2443.

"Search Report of Europe Counterpart Application", issued on Jun. 13, 2024, p. 1-p. 9.

* cited by examiner

LEARNING SYSTEM OF PRECIPITABLE WATER VAPOR ESTIMATION MODEL, PRECIPITABLE WATER VAPOR ESTIMATION SYSTEM, METHOD, AND COMPUTER-READABLE RECORDING MEDIUM

CROSS-REFERENCE TO RELATED APPLICATION

The present application is a continuation of PCT/JP2021/022472, filed on Jun. 14, 2021, and is related to and claims priority from Japanese patent application no. 2020-120319, filed on Jul. 14, 2020. The entire contents of the aforementioned applications are hereby incorporated by reference herein.

TECHNICAL FIELD

The disclosure relates to a learning system of a precipitable water vapor estimation model, a precipitable water vapor estimation system, a method, and a computer-readable recording medium.

BACKGROUND

It has been known to use a GNSS receiver, a microwave radiometer, etc. for the observation of a precipitable water vapor, that is, the observation of water vapor.

Water vapor observation based on a GNSS receiver utilizes multi-frequency radio waves emitted from satellites. If radio waves of two or more different frequencies emitted from four or more satellites can be received, an amount of delay in the radio waves can be detected. The amount of delay in radio waves corresponds to the water vapor amount, making it possible to observe the water vapor amount. Water vapor observation using a global navigation satellite system (GNSS) can provide stable measurement without calibration. As GNSS involves satellites distributed all over the sky, it is possible to obtain an average value of water vapor over a wide range of the sky, but water vapor in a local range cannot be observed.

Water vapor observation based on a microwave radiometer exploits the radiation of radio waves from water vapor in the atmosphere and measures radio waves from water vapor and cloud. With the directivity of an antenna or a horn of a receiver, it is possible to measure water vapor in a local range of the sky compared to water vapor observation based on GNSS. However, regular calibration with liquid nitrogen is required to prevent equipment drift and to measure the correct brightness temperature. Nonetheless, liquid nitrogen is difficult to transport and handle.

SUMMARY

A learning system of a precipitable water vapor estimation model according to the disclosure may include a radio wave intensity acquisition part, a precipitable water vapor acquisition part, and a learning part. The radio wave intensity acquisition part acquires radio wave intensities of a plurality of frequencies among radio waves received by a microwave radiometer. The precipitable water vapor acquisition part acquires a precipitable water vapor calculated based on an atmospheric delay of a GNSS signal received by a GNSS receiver. A learning system of a precipitable water vapor estimation model includes processing circuitry configured to acquire radio wave intensities of a plurality of frequencies among radio waves received by a microwave radiometer; acquire a precipitable water vapor calculated based on an atmospheric delay of a GNSS signal received by a GNSS receiver; and subject an estimation model to machine learning such that an input data based on the radio wave intensities of the plurality of frequencies is taken as an input to output the precipitable water vapor, based on the radio wave intensities of the plurality of frequencies and the precipitable water vapor at a plurality of time points in a particular period.

In an embodiment, the processing circuitry may be further configured to calculate the input data that is dimensionally reduced and that represents the radio wave intensities of the plurality of frequencies based on a dimension reduction process on the radio wave intensities of the plurality of frequencies.

In an embodiment, the processing circuitry may be further configured to perform a standardization process on the radio wave intensities of the plurality of frequencies at the plurality of time points before the dimension reduction process.

A precipitable water vapor estimation system according to an embodiment of the disclosure may include processing circuitry configured to acquire radio wave intensities of a plurality of frequencies among radio waves received by a microwave radiometer; and output a precipitable water vapor corresponding to an input data based on the acquired radio wave intensities of the plurality of frequencies, by using an estimation model that was subjected to machine learning such that an input data based on radio wave intensities of the plurality of frequencies is taken as an input to output the precipitable water vapor.

In an embodiment, the processing circuitry may be further configured to calculate the input data that is dimensionally reduced and represents the radio wave intensities of the plurality of frequencies based on a dimension reduction process on the radio wave intensities of the plurality of frequencies.

In an embodiment, the processing circuitry may be further configured to perform a standardization process on the radio wave intensities of the plurality of frequencies using a predetermined standardization parameter before the dimension reduction process.

A learning method of a precipitable water vapor estimation model according to an embodiment of the disclosure may include steps below. Radio wave intensities of a plurality of frequencies are acquired among radio waves received by a microwave radiometer. A precipitable water vapor calculated based on an atmospheric delay of a GNSS signal received by a GNSS receiver is acquired. An estimation model is subjected to machine learning such that an input data based on the radio wave intensities of the plurality of frequencies is taken as an input to output the precipitable water vapor, based on the radio wave intensities of the plurality of frequencies and the precipitable water vapor at a plurality of time points in a particular period.

A precipitable water vapor estimation method according to an embodiment of the disclosure may include steps below. Radio wave intensities of a plurality of frequencies are acquired among radio waves received by a microwave radiometer. A precipitable water vapor corresponding to an input data based on the acquired radio wave intensities of the plurality of frequencies is outputted by using an estimation model that has been subjected to machine learning such that an input data based on radio wave intensities of the plurality of frequencies is taken as an input to output the precipitable water vapor.

A non-transitory computer-readable medium having stored thereon computer-executable instructions which, when executed by a computer, cause the computer to execute the learning method of a precipitable water vapor estimation model described above.

A non-transitory computer-readable medium having stored thereon computer-executable instructions which, when executed by a computer, cause the computer to execute the precipitable water vapor estimation method described above.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DESCRIPTION OF EMBODIMENTS

Embodiments of the disclosure provide techniques to make it possible to observe a precipitable water vapor in a local range without calibration using liquid nitrogen.

An embodiment of the disclosure will be described below with reference to the drawings.

Figure 1:
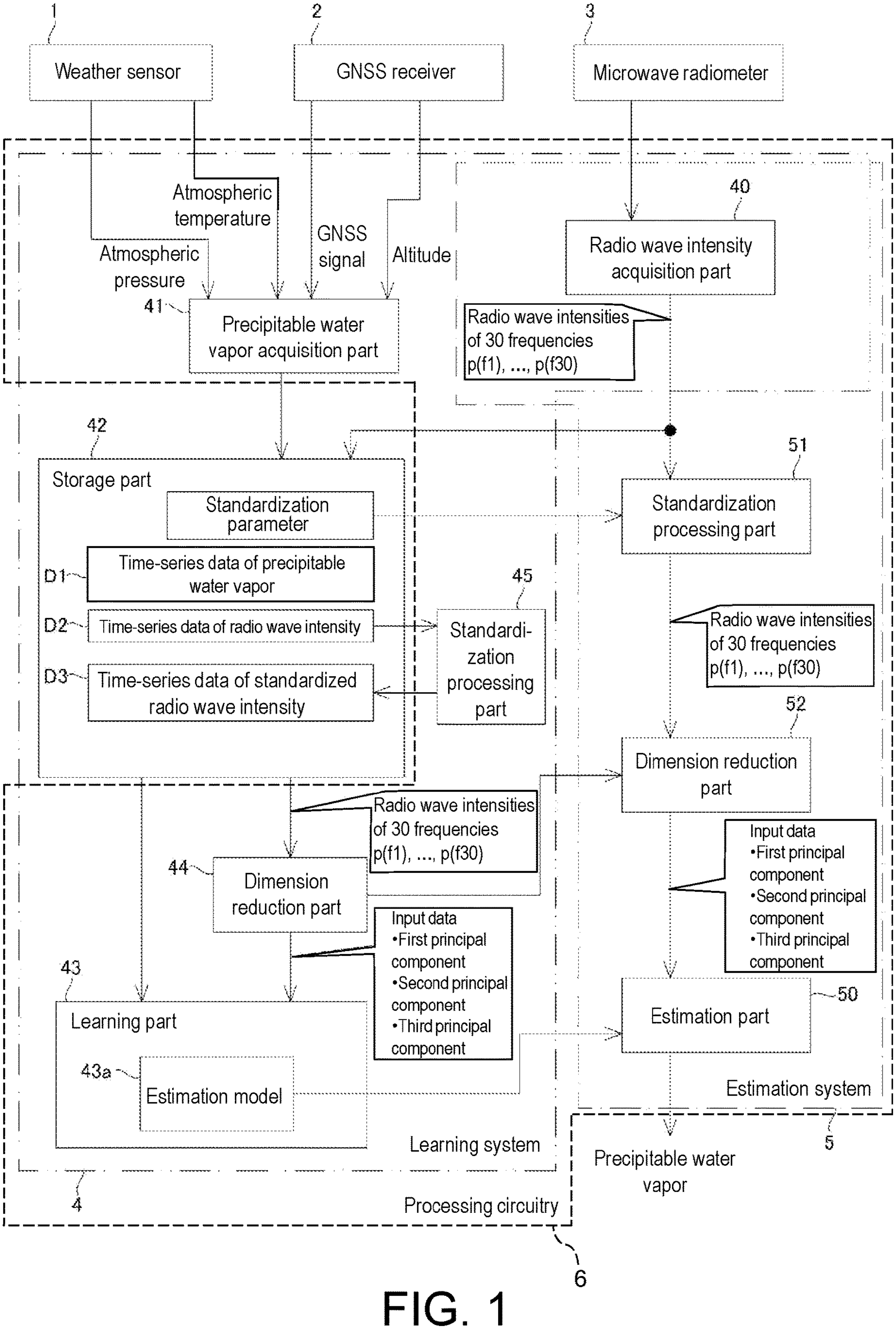
FIG. 1 is a block diagram showing a configuration of a learning system of a precipitable water vapor estimation model and a precipitable water vapor estimation system according to an embodiment.

FIG. 1 is a view showing a configuration of a learning system 4 of a precipitable water vapor estimation model and a precipitable water vapor estimation system 5 (also referred to as an estimation system 5) according to this embodiment.

As shown in FIG. 1, in this embodiment, the learning system 4 of the precipitable water vapor estimation model and the precipitable water vapor estimation system 5 are built on a same computer system, but they may be operated independently. That is, it is possible that only the learning system 4 is installed, or only the precipitable water vapor estimation system 5 is installed.

<Learning System 4>

The learning system 4 shown in FIG. 1 includes a radio wave intensity acquisition part 40, a precipitable water vapor acquisition part 41, and a learning part 43.

The radio wave intensity acquisition part 40 shown in FIG. 1 acquires radio wave intensities of a plurality of frequencies among radio waves received by a microwave radiometer 3. In this embodiment, radio wave intensities of N (N=30) different frequencies of 18 GHz or more and within 26.5 GHz are acquired. The radio wave intensity acquisition part 40 acquires radio wave intensities [p(f1), p(f2), . . . , p(f29), . . . p(f30)] of 30 different frequencies (f1, f2, f29, f30). Herein, the radio wave intensity is indicated as p(f), where f indicates the frequency. The radio wave intensities of a plurality of frequencies acquired by the radio wave intensity acquisition part 40 are stored to a storage part 42 as time-series data D2 of radio wave intensities.

Figure 4:
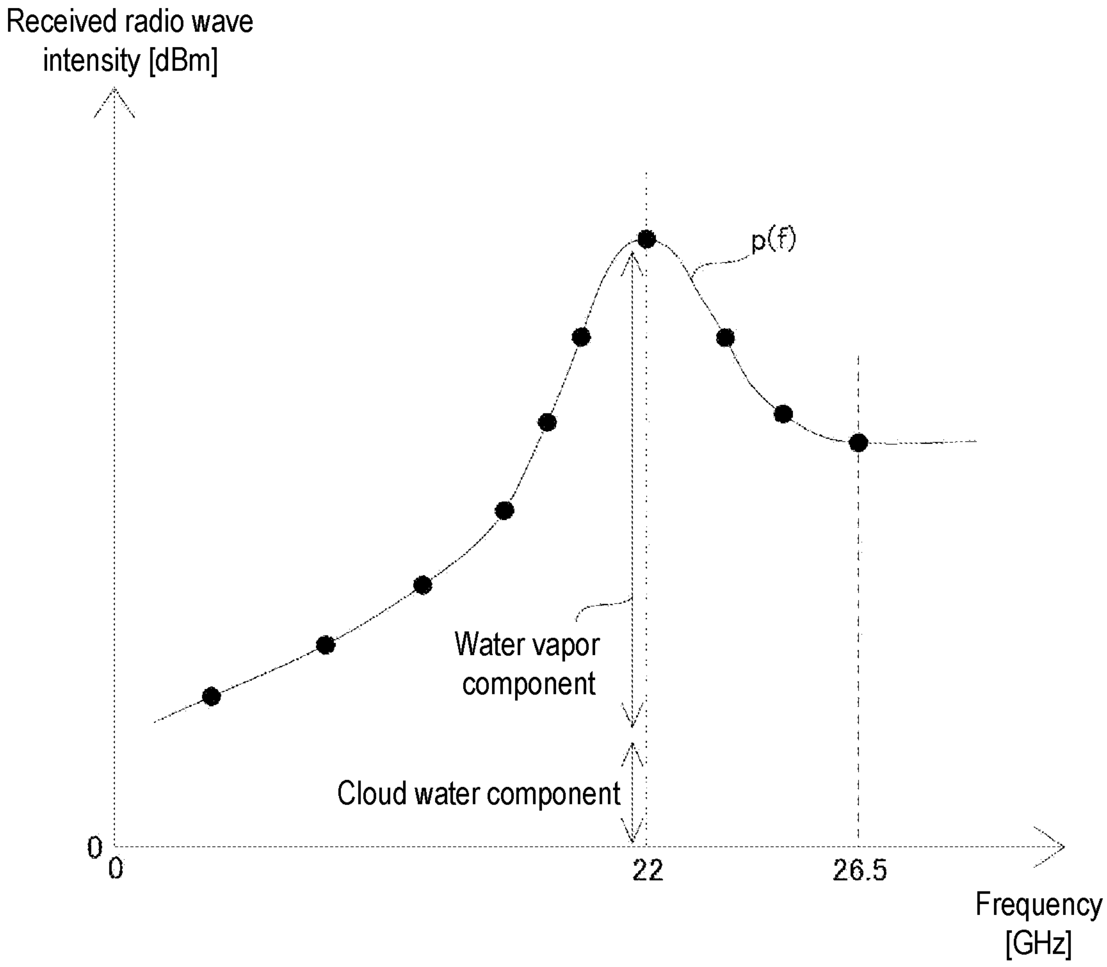
FIG. 4 is a diagram showing a frequency spectrum of radio wave intensity received by a microwave radiometer.

As shown in FIG. 4, the peak of intensity of radio waves radiated from water vapor and cloud water in the sky is at 22 GHz. In FIG. 4, the received intensity p(f) of the microwave radiometer 3 is shown, where f indicates the frequency. For example, a radio wave of 22 GHz contains a precipitable water vapor, that is, a water vapor component, and a cloud water component. To remove the cloud water amount contained in the radio wave of 22 GHz, the cloud water component is calculated based on radio wave intensities of frequencies other than 22 GHz. Thus, radio wave intensities of a plurality of mutually different frequencies are required. Although 22 GHz has been shown as an example, since the water vapor component and the cloud water component are also contained in frequencies other than 22 GHz, the combination of frequencies is not limited to a combination of 22 GHz and frequencies other than 22 GHz. In this embodiment, "N=30" has been set, but the number of N may be changed as appropriate. The frequency range may include 22 GHz or 22 GHz f 1 GHz. Although N=30 in this embodiment, it is not limited thereto. N may be a natural number of 3 or more to improve the accuracy of specifying the water vapor component and the cloud water component.

In addition, in this embodiment, a black body is periodically passed through a receiving range of an antenna of the microwave radiometer 3 by an actuator, and the radio wave from the black body whose intensity is known and the radio wave from the sky are received. The received intensity p(f) of the microwave radiometer 3 is a radio wave intensity ps(f) from the sky minus a radio wave intensity pb(f) from the black body. Of course, the microwave radiometer 3 is not limited thereto, and a mirror may be periodically moved to receive radio waves from the black body.

The precipitable water vapor acquisition part 41 shown in FIG. 1 acquires a precipitable water vapor calculated based on an atmospheric delay (strictly speaking, a tropospheric delay) of a GNSS signal received by a GNSS receiver 2. It is known that a precipitable water vapor (precipitable water vapor; PWV) according to GNSS may be calculated based on a GNSS signal, a coordinate value such as an altitude, an atmospheric temperature, and an atmospheric pressure. The precipitable water vapor acquisition part 41 acquires a GNSS precipitable water vapor using a GNSS signal and altitude information obtained from the GNSS receiver 2, and an atmospheric temperature and an atmospheric pressure obtained from a weather sensor 1. The GNSS precipitable water vapor acquired by the precipitable water vapor acquisition part 41 is stored to the storage part 42 as time-series data D1 of precipitable water vapor of GNSS.

The learning part 43 shown in FIG. 1 subjects an estimation model 43*a* to machine learning based on the time-series data D1 of precipitable water vapor and the time-series data D2 of radio wave intensity. Specifically, based on the radio wave intensities of the plurality of frequencies and the precipitable water vapor at a plurality of time points in a particular period, the learning part 43 subjects the estimation model 43*a* to machine learning such that an input data based on the radio wave intensities of the plurality of frequencies is taken as an input to output the precipitable water vapor. A teacher data set used by the learning part 43 is data in which a precipitable water vapor at a time point t is associated with an input data based on radio wave intensities [p(f1), p(f2), . . . , p(129), p(f30)] of a plurality of frequencies at the same time point t. As long as the input data is a data based on radio wave intensities of a plurality of frequencies, the input data may be the radio wave intensities themselves of the plurality of frequencies, or may be a data obtained by reducing the dimension of the radio wave intensities of the plurality of frequencies. If the estimation model 43*a* is a supervised machine learning model, various models such as linear regression, regression trees, random forests, support vector machines, neural networks, ensemble, etc. may be used. In this embodiment, although will be described in detail later, a polynomial regression using terms of second order or higher, which is a multiple regression with multiple types of variables, is adopted, but the embodiment is not limited thereto.

As shown in FIG. 1, the learning system 4 may include a dimension reduction part 44 which performs a dimension reduction process on radio wave intensities of a plurality of frequencies and calculates a dimensionally reduced input data representing the radio wave intensities of the plurality of frequencies. By reducing the dimension, it is possible to reduce the number of dimensions while reproducing the original features that are present in the radio wave intensities of the plurality of frequencies, making it possible to reduce the calculation cost and avoid the curse of dimensionality (overlearning). The dimension reduction method of this embodiment is principal component analysis (PCA), but the dimension reduction method is not limited thereto, and other algorithms such as factor analysis, multiple factor analysis, Autoencoder, independent component analysis, non-negative matrix factorization, etc. may also be used.

In this embodiment, using principal component analysis, the dimension reduction part 44 selects a first principal component, a second principal component, and a third principal component as the input data. Of course, the embodiment is not limited thereto, and various modifications are possible. For example, the input data may be the first principal component only of the principal component analysis, or may be the first principal component and the second principal component. That is, a particular number (an arbitrary natural number of 1 or more) of principal components from the first order onward are selected as the input data. The particular number may be appropriately set according to the required accuracy. The reason why the first principal component is always included is that the reproducibility of the original feature of the first principal component is the highest.

A standardization processing part 45 shown in FIG. 1 performs a standardization process on radio wave intensities [p(f1), p(f2), . . . , p(f29), p(f30)] of a plurality of frequencies at a plurality of time points before the dimension reduction process according to principal component analysis is performed. The standardization processing part 45 performs a standardization process on the time-series data D2 of radio wave intensity stored in the storage part 42, and stores time-series data D3 of standardized radio wave intensity to the storage part 42. The standardization process is a process for performing centering to set the mean to 0 and performing scaling to set the standard deviation to 1. In the standardization process, by calculating a mean and a standard deviation for respective radio wave intensities at a plurality of time points and dividing, by the standard deviation, a value obtained by subtracting the mean from the original data, each original radio wave intensity is converted into a standardized radio wave intensity. The calculated mean and standard deviation are stored to the storage part 42 as standardization parameters for use in a standardization process of the precipitable water vapor estimation system 5 to be described later (see FIG. 1).

The learning system 4 of this embodiment includes the dimension reduction part 44 and the standardization processing part 45, but these parts may also be omitted.

Specific Examples of Learning Part 43 and Estimation Model 43*a*

Taking a first principal component PC1, a second principal component PC2, and a third principal component PC3 as an input data, the learning part 43 shown in FIG. 1 constructs an estimation model 43*a* for calculating a precipitable water vapor (PWV). The estimation model 43*a* is a conversion formula using multiple regression and is expressed by Formula (1) below. By performing fitting using the least squares method, the following unknown coefficients $S_1$ to $S_{10}$ are calculated to construct the estimation model 43*a*.

[Math 1]

$$PWV = func(PC1, PC2, PC3) \tag{1}$$

$$= (S_1 \; S_2 \; S_3 \; S_4 \; S_5 \; S_6 \; S_7 \; S_8 \; S_9 \; S_{10}) \begin{pmatrix} PC1^2 \\ PC2^2 \\ PC3^2 \\ PC1 \\ PC2 \\ PC3 \\ PC1 \cdot PC2 \\ PC1 \cdot PC3 \\ PC2 \cdot PC3 \\ 1 \end{pmatrix}$$

<Precipitable Water Estimation System 5>

The precipitable water vapor estimation system 5 shown in FIG. 1 includes the radio wave intensity acquisition part 40 and an estimation part 50. Using the estimation model 43*a* constructed by the learning part 43, the estimation part 50 receives an input data based on radio wave intensities of a plurality of frequencies acquired by the radio wave intensity acquisition part 40 and outputs a corresponding precipitable water vapor. Although the radio wave intensities [p(f1), p(f2), . . . , p(f29), p(f30)] of a plurality of frequencies at an estimation time point may be inputted to the estimation part 50, to improve accuracy, a standardization processing part 51 and a dimension reduction part 52 may be provided.

Using predetermined parameters, the standardization processing part 51 shown in FIG. 1 performs a standardization process on the radio wave intensities of the plurality of frequencies before a dimension reduction process is performed by the dimension reduction part 52. The standardization parameters are parameters (mean, standard deviation) calculated by the standardization processing part 45 of the learning system 4. The standardization processing part 51 does not calculate the parameters (mean, standard deviation), but the rest of the process is the same as that of the standardization processing part 45 of the learning system 4.

The dimension reduction part 52 shown in FIG. 1 performs a dimension reduction process on the radio wave intensities of the plurality of frequencies and calculates a dimensionally reduced input data representing the radio wave intensities of the plurality of frequencies. The dimension reduction part 52 uses the same parameters as the parameters calculated by the dimension reduction part 44 of the learning system 4.

The processes in the learning system 4 and the precipitable water vapor estimation system 5 shown in FIG. 1 may be performed by processing circuitry 6.

<Learning Method of Precipitable Water Vapor Estimation Model>

Figure 2:
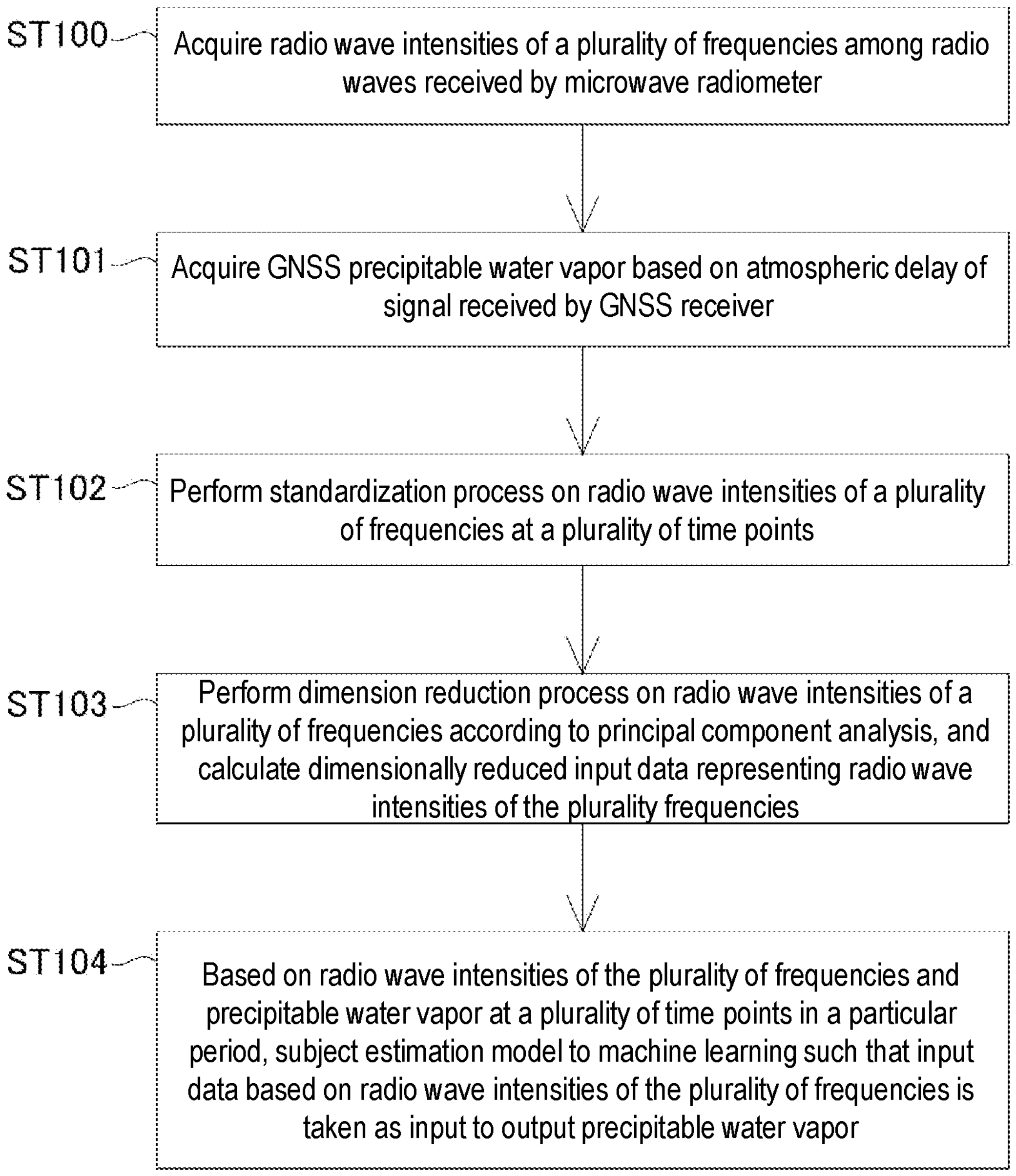
FIG. 2 is a flowchart showing a process executed by the learning system.

A learning method of the precipitable water vapor estimation model will be described with reference to FIG. 2. As shown in FIG. 2, in step ST100, the radio wave intensity acquisition part 40 acquires radio wave intensities of a plurality of frequencies among radio waves received by the microwave radiometer. In step ST101, the precipitable water vapor acquisition part 41 acquires a precipitable water vapor calculated based on an atmospheric delay of a GNSS signal received by the GNSS receiver. The order of steps ST100 and ST101 is not particularly specified.

In next step ST102, the standardization processing part 45 performs a standardization process on the radio wave intensities of the plurality of frequencies at a plurality of time points. In next step ST103, the dimension reduction part 44 performs a dimension reduction process on the radio wave intensities of the plurality of frequencies according to principal component analysis, and calculates a dimensionally reduced input data representing the radio wave intensities of the plurality of frequencies. In next step ST104, based on the radio wave intensities of the plurality of frequencies and the precipitable water vapor at a plurality of time points in a particular period, the learning part 43 subjects an estimation model to machine learning such that the input data based on the radio wave intensities of the plurality of frequencies are taken as an input to output the precipitable water vapor.

<Precipitable Water Vapor Estimation Method>

Figure 3:
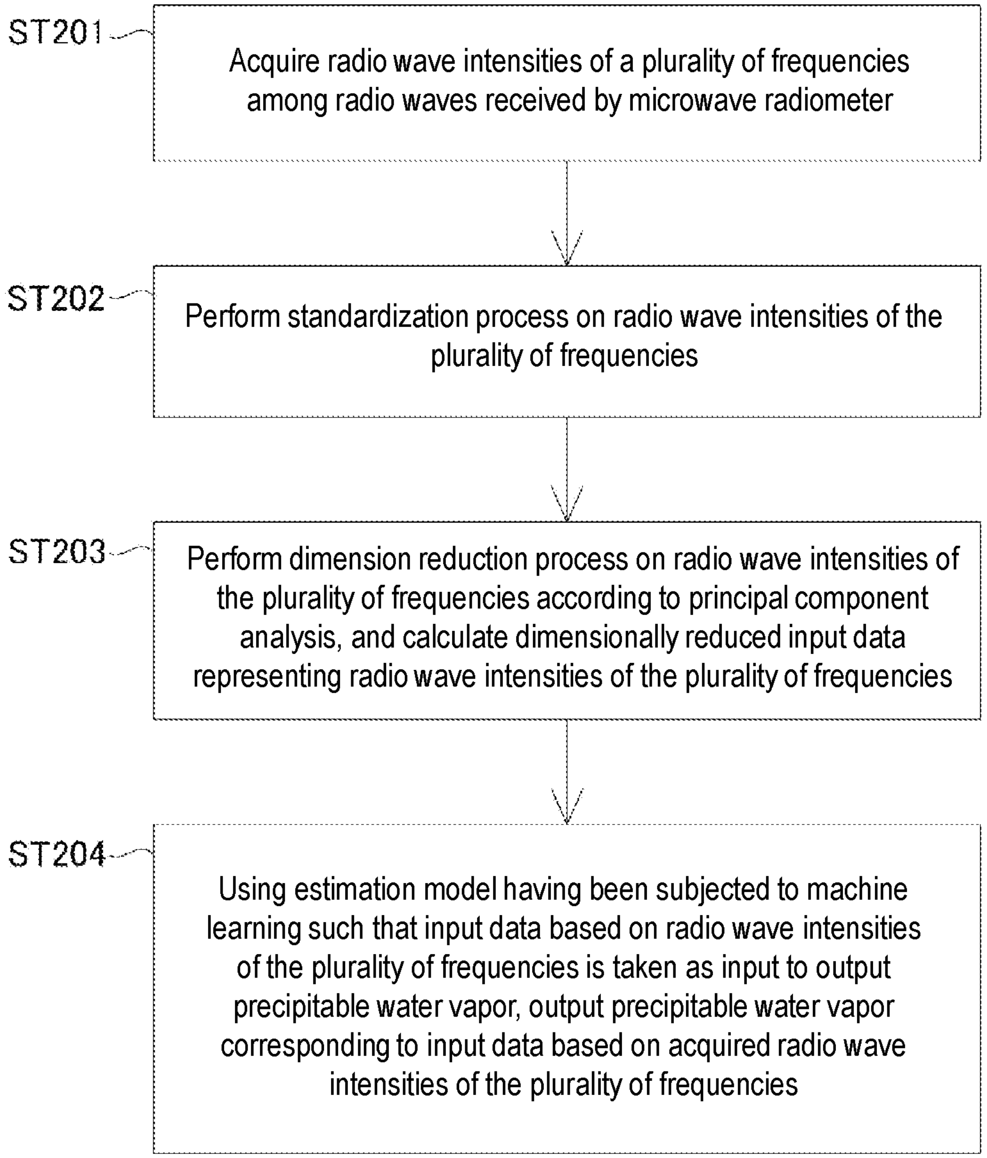
FIG. 3 is a flowchart showing a process executed by the precipitable water vapor estimation system.

A precipitable water vapor estimation method will be described with reference to FIG. 3. As shown in FIG. 3, in step ST201, the radio wave intensity acquisition part 40 acquires radio wave intensities of a plurality of frequencies among radio waves received by the microwave radiometer. In next step ST202, the standardization processing part 51 performs a standardization process on the radio wave intensities of the plurality of frequencies. In next step ST203, the dimension reduction part 52 performs a dimension reduction process on the radio wave intensities of the plurality of frequencies according to principal component analysis, and calculates a dimensionally reduced input data representing the radio wave intensities of the plurality of frequencies. In next step ST204, using the estimation model 43*a* which has been subjected to machine learning such that the input data based on the radio wave intensities of the plurality of frequencies is taken as an input to output the precipitable water vapor, the estimation part 50 outputs the precipitable water vapor corresponding to the input data based on the acquired radio wave intensities of the plurality of frequencies.

Figure 5:
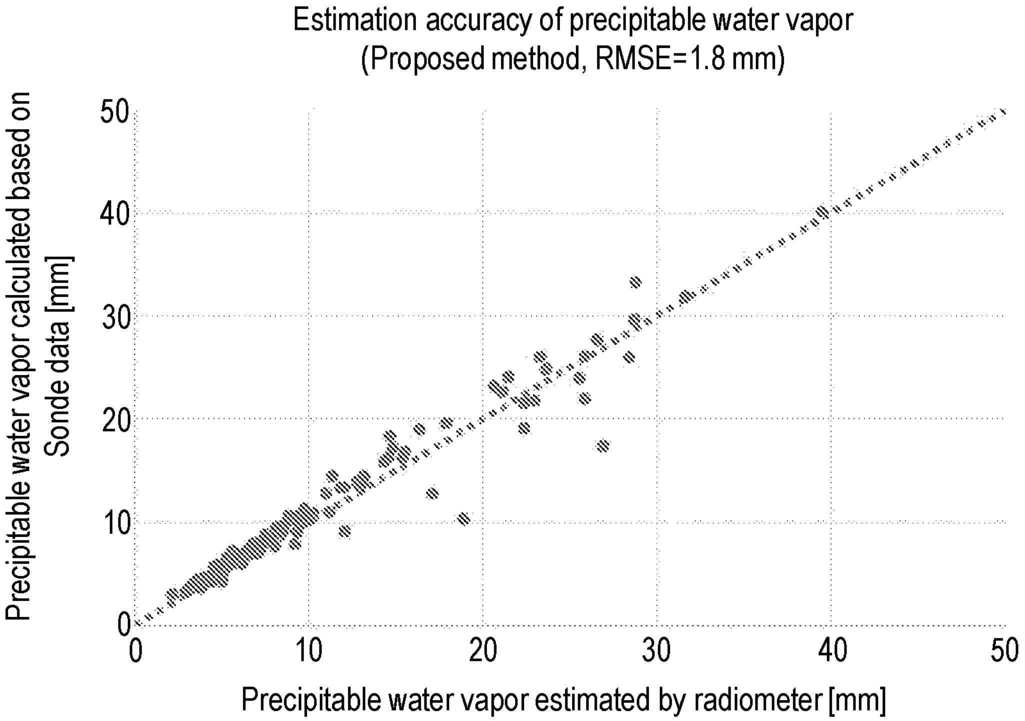
FIG. 5 is a diagram showing comparison between a precipitable water vapor in a period estimated by the precipitable water vapor estimation system and a precipitable water vapor in the same period based on Sonde data.

FIG. 5 is a diagram showing comparison between a precipitable water vapor in a period estimated by an estimation model constructed by the learning system 4 and the precipitable water vapor estimation system 5 and a precipitable water vapor in the same period based on Sonde data. The Sonde data are data published by the Japan Meteorological Agency and are actual meteorological observation values measured by flying real balloons equipped with sensors to the sky. As shown in FIG. 5, the root mean square error (RMSE) is 1.8 mm, indicating that a certain degree of accuracy is obtained.

In addition, in the present method, since radio wave intensities of a plurality of frequencies are acquired, even if noise is contained in the radio wave intensities of some frequencies due to adoption of a general-purpose amplifier with a high noise temperature, as a plurality of frequencies are used, the influence of noise can be suppressed. Thus, for example, compared to the case of estimating a precipitable water vapor according to a particular arithmetic expression using two specific frequencies, the present method is considered to be robust against noise. Conversely, even if some noise is contained, since it can be covered with the plurality of frequencies, the equipment used does not necessarily need to have high performance, and it is possible to reduce the cost of the system.

As described above, the learning system 4 of the precipitable water vapor estimation model of this embodiment includes the radio wave intensity acquisition part 40, the precipitable water vapor acquisition part 41, and the learning part 43. The radio wave intensity acquisition part 40 acquires radio wave intensities of a plurality of frequencies among radio waves received by the microwave radiometer 3. The precipitable water vapor acquisition part 41 acquires a precipitable water vapor calculated based on an atmospheric delay of a GNSS signal received by the GNSS receiver 2. Based on the radio wave intensities of the plurality of frequencies and the precipitable water vapor at a plurality of time points in a particular period, the learning part 43 subjects the estimation model 43*a* to machine learning such that an input data based on the radio wave intensities of the plurality of frequencies is taken as an input to output the precipitable water vapor.

The learning method of the precipitable water vapor estimation model of this embodiment includes steps below. Radio wave intensities of a plurality of frequencies are acquired among radio waves received by the microwave radiometer 3. A precipitable water vapor calculated based on an atmospheric delay of a GNSS signal received by the GNSS receiver 2 is acquired. Based on the radio wave intensities of the plurality of frequencies and the precipitable water vapor at a plurality of time points in a particular period, the estimation model 43*a* is subjected to machine learning such that an input data based on the radio wave intensities of the plurality of frequencies is taken as an input to output the precipitable water vapor.

The precipitable water vapor estimation system of this embodiment includes the radio wave intensity acquisition part 40 and the estimation part 50. The radio wave intensity acquisition part 40 acquires radio wave intensities of a plurality of frequencies among radio waves received by the microwave radiometer 3. Using the estimation model 43*a* which has been subjected to machine learning such that an input data based on radio wave intensities of the plurality of frequencies is taken as an input to output a precipitable water vapor, the estimation part 50 outputs the precipitable water vapor corresponding to an input data based on the acquired radio wave intensities of the plurality of frequencies.

The precipitable water vapor estimation method of this embodiment includes steps below. Radio wave intensities of a plurality of frequencies are acquired among radio waves received by the microwave radiometer 3. Using the estimation model 43*a* which has been subjected to machine learning such that an input data based on radio wave intensities of the plurality of frequencies is taken as an input to output a precipitable water vapor, the precipitable water vapor corresponding to an input data based on the acquired radio wave intensities of the plurality of frequencies is outputted.

According to the learning method, the estimation method, and the system described above, since machine learning is performed using an input data based on radio wave intensities of a plurality of frequencies, machine learning can clarify the correlation between the radio wave intensities and the precipitable water vapor, which could not be clarified with a single frequency because the radio wave intensity contains both water vapor content and cloud water, and it becomes possible to estimate the water vapor content (precipitable water vapor). Further, since the radio wave intensities and the GNSS-based precipitable water vapor at a plurality of time points in a particular period are used, microwave radiometer-based local water vapor data with non-matching absolute values can be converted into reliable local water vapor data with matching absolute values. Highly reliable data can be acquired even without calibrating the microwave radiometer with liquid nitrogen.

As described in this embodiment, the dimension reduction parts 44 and 52 may be included to perform a dimension reduction process on the radio wave intensities of the plurality of frequencies and calculate a dimensionally reduced input data representing the radio wave intensities of the plurality of frequencies. By performing dimension reduction in this manner, since frequencies with good sensitivity processed by the portion of the receiver having good performance are selected from among the plurality of frequencies, estimation may be performed even with a general-purpose inexpensive amplifier. That is, without dimension reduction, frequency bands with poor sensitivity processed by the portion of the receiver having poor performance are directly used for estimation, and the data in the frequency bands with poor sensitivity adversely affect the estimation accuracy. With dimension reduction, it is possible to omit the trouble of manually removing frequencies with poor sensitivity from the plurality of frequencies, and thus it is possible to avoid deterioration of the estimation accuracy.

As described in this embodiment, the dimension reduction parts 44 and 52 may perform dimension reduction according to principal component analysis and select a particular number of principal components from the first order onward as the input data. Thus, principal component analysis may be used for dimension reduction.

As in the learning system 4 of this embodiment, the standardization processing part 45 may be included to perform a standardization process on the radio wave intensities of the plurality of frequencies at a plurality of time points before the dimension reduction process is performed by the dimension reduction part 44. As in the precipitable water vapor estimation system 5 of this embodiment, the standardization processing part 51 may be included to perform a standardization process on the radio wave intensities of the plurality of frequencies using a predetermined standardization parameter before the dimension reduction process is performed by the dimension reduction part 52. Thus, it is possible to appropriately reduce the dimension and improve the estimation accuracy.

As described in this embodiment, the radio wave intensity acquisition part 40 may acquire radio wave intensities of N different frequencies, where n is a natural number of 3 or more, and the dimension reduction parts 44 and 52 may dimensionally reduce the radio wave intensities of the N frequencies to the input data having a number smaller than N. In this manner, by performing dimension reduction, it is possible to reduce the number of dimensions while reproducing the original features that are present in the radio wave intensities of the N frequencies, making it possible to reduce the calculation cost and avoid the curse of dimensionality (overlearning).

A program of this embodiment is a program which causes a computer (one or more processors) to execute the above method. Further, a computer-readable non-transitory recording medium according to this embodiment stores the above program.

Although the embodiments of the disclosure have been described above based on the drawings, it should be considered that the specific configurations are not limited to these embodiments. The scope of the disclosure is indicated not only by the description of the above embodiments but also by the scope of claims, and includes all modifications within the meaning and scope equivalent to the scope of claims.

It is possible to apply the structure adopted in each of the above embodiments to any other embodiments.

The specific configuration of each part is not limited to the above-described embodiments, and various modifications are possible without departing from the scope of the disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A learning system of a precipitable water vapor estimation model, comprising:

a microwave radio meter configured to receive radio waves, wherein the microwave radio meter is not calibrated with liquid nitrogen;

a GNSS receiver configured to receive a GNSS signal;

processing circuitry configured to:

acquire radio wave intensities of a plurality of frequencies among the radio waves received from the microwave radiometer at each of a plurality of time points in a training period;

acquire a precipitable water vapor calculated based on an atmospheric delay of the GNSS signal received from the GNSS receiver at each of the plurality of time points in the training period;

perform principal component analysis on the radio wave intensities of the plurality of frequencies at each of the plurality of time points in the training period so as to select a particular number of principal components corresponding to the radio wave intensities of the plurality of frequencies at each of the plurality of time points; and perform machine learning to train an estimation model using, as training data, for each of the plurality of time points in the training period, a corresponding set including the principal components corresponding to the radio wave intensities of the plurality of frequencies and the precipitable water vapor, wherein the estimation model is configured to receive principal components corresponding to radio wave intensities of a plurality of frequencies among radio waves received from the microwave radiometer at a designated time point as input data and to output an estimated precipitable water vapor.

2. The learning system of a precipitable water vapor estimation model according to claim 1, wherein the processing circuitry is further configured to:

perform a standardization process on the radio wave intensities of the plurality of frequencies acquired at the plurality of time points in the training period before a dimension reduction process using the principal component analysis.

3. The learning system of a precipitable water vapor estimation model according to claim 2, wherein the processing circuitry is configured to:

acquire radio wave intensities of N different frequencies, where N is a natural number greater than or equal to 3, and dimensionally reduce the radio wave intensities of the N frequencies to the input data having a number smaller than N.

4. A learning method of a precipitable water vapor estimation model, comprising:

acquiring radio wave intensities of a plurality of frequencies among radio waves received by a microwave radiometer at each of a plurality of time points in a training period, wherein the microwave radio meter is not calibrated with liquid nitrogen;

acquiring a precipitable water vapor calculated based on an atmospheric delay of a GNSS signal received by a GNSS receiver at each of a plurality of time points in a training period;

performing principal component analysis on the radio wave intensities of the plurality of frequencies at each of the plurality of time points in the training period so as to select a particular number of principal components corresponding to the radio wave intensities of the plurality of frequencies at each of the plurality of time points; and perform machine learning to train an estimation model using, as training data, for each of the plurality of time points in the training period, a corresponding set including the principal components corresponding to the principal components corresponding to the radio wave intensities of the plurality of frequencies and the precipitable water vapor, wherein the estimation model is configured to receive principal components corresponding to radio wave intensities of a plurality of frequencies among radio waves received from the microwave radiometer at a designated time point as an input and to output an estimated precipitable water vapor.

5. A non-transitory computer-readable medium having stored thereon computer-executable instructions which, when executed by a computer, cause the computer to: execute the learning method of a precipitable water vapor estimation model according to claim 4.

* * * * *